P. E. YOUNG.
SPECIFIC GRAVITY BALANCE.
APPLICATION FILED AUG. 21, 1914.
1,188,527.
Patented June 27, 1916.
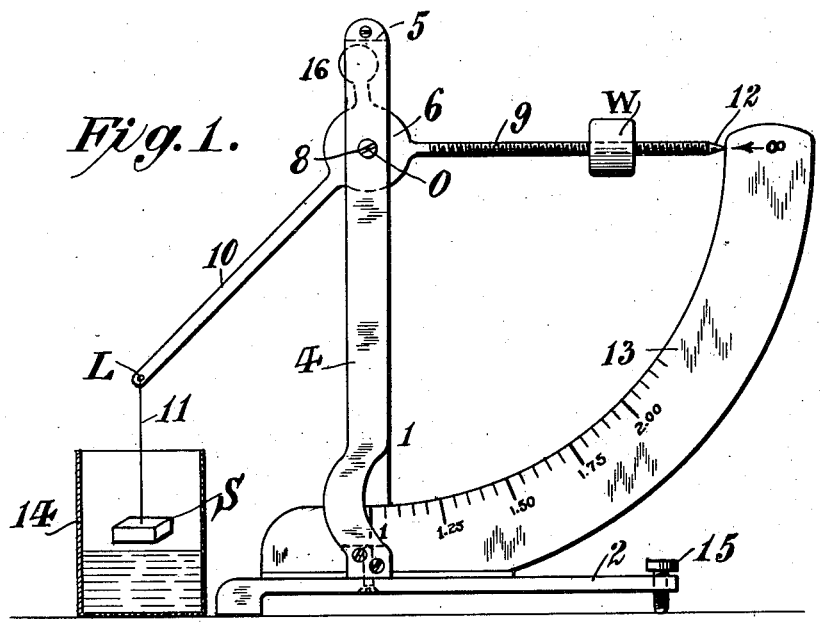
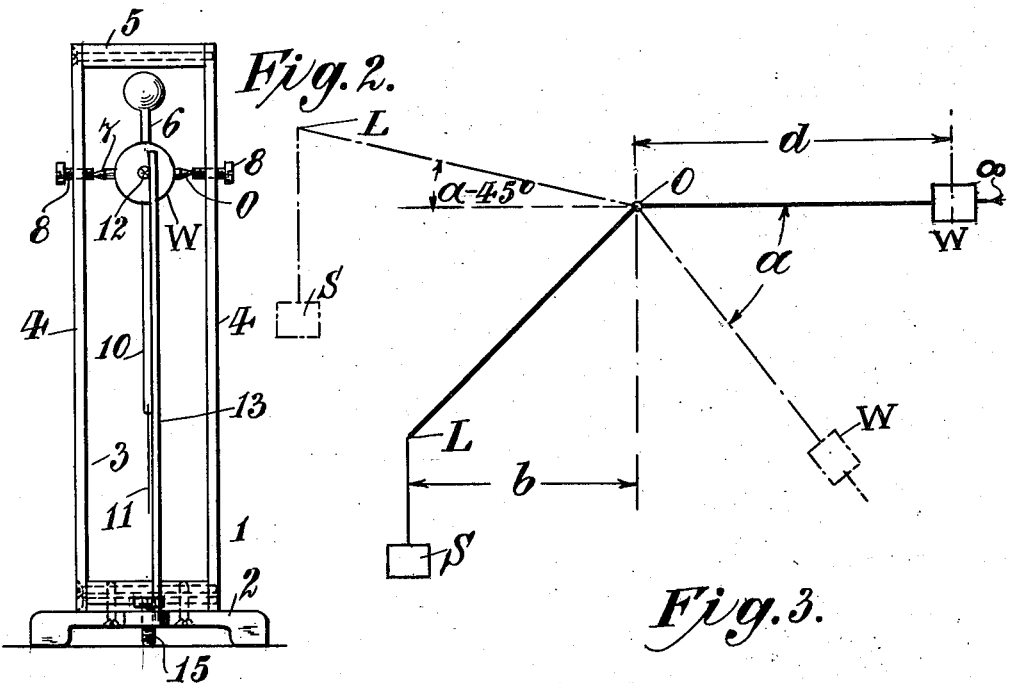
WITNESSES
Geo Schwarz
S. W. Thornton
INVENTOR
Philip E. Young
BY
Maximus Thurston
ATTORNEY

UNITED STATES PATENT OFFICE.

PHILIP E. YOUNG, OF FAIRHAVEN, MASSACHUSETTS.

SPECIFIC-GRAVITY BALANCE.

1,188,527.  Specification of Letters Patent.  Patented June 27, 1916.

Application filed August 21, 1914. Serial No. 857,828.

*To all whom it may concern:*

Be it known that I, PHILIP E. YOUNG, a citizen of the United States, and resident of Fairhaven, in the county of Bristol and State of Massachusetts, have invented certain new and useful Improvements in Specific-Gravity Balances, of which the following is a specification.

My invention relates to improvements in instruments for determining relative densities of solid bodies and particularly relates to such an instrument designed for use in commercial establishments where the specific densities of a large number of different bodies must be determined quickly and with a fair degree of accuracy.

One of the objects of the invention is to provide such an instrument for indicating directly on a suitably graduated scale the specific density of the body with but one balancing operation; without resort to mathematical computations, and without the necessity of taking any refined weighings.

Another object of the invention is to provide a device of the above indicated character which, while retaining all of the advantages of a compact and sensitive balance, provides for a refined and minute sub-division of the specific density scale spread over a long run.

One means of obtaining these objects is to provide a tangent balance carrying a relatively long pointer movable over a quadrant scale of relatively large radius graduated in numerical values indicating specific densities and in the embodiment of the invention where the arms of the balance are at 135° to each other the numbered graduations are so spaced relative to each other that the tangent of the angle of movement caused by the buoyant effect of the displaced water on the submerged body will be equal to $$\frac{1}{g-1}$$

where $g$ indicates any of the values indicating the specific densities within the range of the instrument.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings: Figure 1 is a side elevation of an instrument disclosing a preferred embodiment of my invention; Fig. 2 is an end elevation of the device shown in Fig. 1; and Fig. 3 is an explanatory diagram illustrating the mathematics of the device.

The instrument illustrated is a sensitive tangent balance including a frame 1 comprising a broad, and preferably heavy, base plate 2 fixed to which is a beam support 3 formed of transversely spaced apart uprights 4 braced adjacent the top by a connecting spacing rod 5. A balance beam 6 is pivotally mounted between the uprights 4 and is free to oscillate in a vertical plane. The beam is mounted on a horizontally disposed pivot pin 7 journaled in end bearings 8, threaded into the uprights 4 and providing the fulcrum O for the balance. The beam comprises a pair of balance arms projecting on opposite sides of the fulcrum and may extend at any angle to each other, but for determining densities from "one" to "two," a depending angle of a hundred and thirty-five degrees between the arms has been found to be the most efficient. However, one type of device now in general use has the arm designed to form practically a straight angle with the scale graduated accordingly. One of the arms 9, hereinafter designated as the weight arm, is arranged to be horizontally disposed when the turning moments about the fulcrum are balanced and a counterbalancing weight W is slidably mounted thereon to and from the fulcrum. To provide for a refined adjustment of the weight and to hold the same in set position relative to the fulcrum the arm is preferably threaded micrometrically so that the weight may be rotated thereon to accurately counterbalance the body S, the specific density of which is to be determined. The other arm 10, hereinafter referred to as the body arm, has a fine wire 11 suspended therefrom at a point L units of length from the fulcrum and marking the extreme working length of the body arm. This wire is arranged to support the body S in any convenient manner usual in operations of this character. A pointer 12 extends radially from the fulcrum, is attached to the beam to indicate the angle of movement thereof and is made relatively long so as to magnify this movement. The weight arm may be made relatively long and light and the end reduced to form a sharp pointer, which arrangement eliminates the necessity of providing a special member to form the pointer. The extreme end of the pointer is arranged to move over a suitably curved scale 13 under the influence of the buoyant effect of the displaced water contained in a suitable receptacle 14 when the body S is submerged below the level of the water therein. The scale is in the form of a quadrant disposed on the side of the support having the weight arm with its lower portion affixed to the base and arranged so as to extend substantially in the plane of movement of the weight arm and in a curve about the fulcrum as a center.

The scale is provided with a "balance mark" $\infty$ positioned thereon in a horizontal plane containing the axis of oscillation of the balance and opposite the position assumed by the pointer when the weight W counterbalances the body S in air. The scale is graduated in progressively increasing numerical values toward the "balance mark" from "one" which is positioned ninety degrees from the "balance mark" and at the point on the scale opposite the position assumed by the pointer when the displaced water entirely supports the weight of the submerged body.

The base plate 2 is adjustable vertically so that the "one" on the scale is perpendicularly below the axis of oscillation of the beam and for this purpose the plate is made substantially triangular in plan with one or more feet along a side thereof which is parallel with the axis of oscillation of the beam and with a vertically adjustable support, such as a leveling screw 15, positioned in the angle opposite the side having the foot and positioned beneath the scale.

The values opposite the graduations on the scale indicate specific densities and are each equal to the expression $$\frac{1}{\tan.\alpha} - 1,$$

where $\alpha$ is the angle of movement of the pointer in passing from the "balance mark" to the position opposite the particular graduation, under the action of the buoyant effect of the displaced water on the submerged body.

Should it be desired to construct a scale quickly and without the necessity of accurately spacing the graduations according to the formula, value "two" can be placed forty-five degrees from the "one" on the scale and the intervening arc divided with equally spaced graduations numbered in correspondingly progressing fractional values from "one" to "two" which values will indicate approximately the specific densities of the submerged bodies when the pointer swings to the value under the buoyant effect of the displaced water. This equal spacing of the graduations on a part of the scale permits of a simple and readily constructed scale for use in determining specific densities of from "one" to "two" without the necessity of accurate relative spacing of the graduations on the scale in terms of an arithmetic progression and at the same time the equally spaced readings indicate values sufficiently accurate for most commercial requirements.

The beam including the weight arm, the balance arm and the wire for supporting the body S is balanced about the fulcrum and to facilitate the construction of a device providing this equilibrium of forces about the fulcrum when the body and weight are omitted the beam is provided with a counterbalancing ball 16 extending therefrom above the fulcrum.

In operation, the instrument is placed on a firm support and is adjusted by means of the leveling screw until the pointer is opposite "one" on the scale when the body arm is free of any weight. The body, the specific density of which is to be determined, is suspended in air on the wire 11, $b$ units of length from the perpendicular passing through the fulcrum and the weight W is adjusted to such a position, $d$ units of length from the fulcrum in which position of the parts the turning moments on the beam are balanced about the fulcrum under which conditions the pointer is opposite the balance mark $\infty$ on the scale. The body is then submerged in water and freed from air bubbles adhering thereto and to the wire as is usual in operations of this character. The submerged object will have an apparent loss of weight and the beam will be acted upon by the turning moment of the weight arm to swing the pointer over an angle $\alpha$ into the position on the scale to indicate the specific density of the submerged object by the direct reading of the scale. These values on the scale indicate the specific densities of the submerged body for as will be noted by reference to the diagram constituting Fig. 3:

When body S is suspended on wire 11 and weight W is moved so that pointer 12 is opposite ∞:

$$Sb = Wd = S\frac{L}{\sqrt{2}}$$

$$S = \frac{\sqrt{2}Wd}{L}$$

When body S is immersed in water its weight becomes $S_1$ and $S_1 L \cos.(\alpha - 45°) = dW \cos.\alpha$ $$\cos.(\alpha - 45°) = \frac{\cos.\alpha + \sin.\alpha}{\sqrt{2}}$$

$$S_1 L\left(\frac{\cos.\alpha + \sin.\alpha}{\sqrt{2}}\right) = dW \cos.\alpha$$

$$S_1 = \frac{dW \cos.\alpha \sqrt{2}}{L(\cos.\alpha + \sin.\alpha)}$$

Specific density =

$$\frac{S}{S-S_1} = \frac{\dfrac{Wd\sqrt{2}}{L}}{\dfrac{Wd\sqrt{2}}{L} - \dfrac{Wd\sqrt{2}}{L}\left(\dfrac{\cos.\alpha}{\cos.\alpha+\sin.\alpha}\right)}$$

Therefore specific density equals $$\frac{1}{1 - \left(\dfrac{\cos.\alpha}{\cos.\alpha + \sin.\alpha}\right)}$$

Therefore $$\frac{\cos.\alpha + \sin.\alpha}{\cos.\alpha} = \frac{g}{g-1}$$

$$1 + \tan.\alpha = \frac{g}{g-1}$$

$$\tan.\alpha = -1 + \frac{g}{g-1} = \frac{1}{g-1}$$

Therefore $$\alpha = \text{anti-tangent}\ \frac{1}{g-1}$$

or the angle through which the pointer passes is equal to the angle whose tangent is 1 divided by $g-1$.

By means of a device of this character the specific density is obtained by the submersion method which permits of extreme accuracy and the apparent loss of weight of the body is in effect definitely ascertained irrespective of any irregularity in the configuration of the body. As the operation does not involve any weighings the error usually introduced in ascertaining the weight of the body in terms of some weight units is eliminated and there is also avoided the possible error arising from both subtracting and dividing operations usual in ascertaining specific densities by the submersion method.

While the invention has been described particularly with reference to an instrument intended for commercial use, it is obvious that all of the refinements usual in the construction of sensitive chemical balances may be employed and that various omissions, substitutions and changes in the form and details of the device illustrated and in its operation may be made by those skilled in the art without departing from the spirit of the invention. For example, if the body S has a predetermined gravity, then the density of the liquid in the receptacle 14 may be directly determined through the position of the arm 9 merely by providing the quadrant with a suitable scale. It is also obvious that should the arms of the balance have some other relation than the 135° described, then the graduations of the scale would be plotted from the relation of the horizontal distance between weight W and the perpendicular through the fulcrum and the horizontal distance between the body S and said perpendicular.

Should it be desired to construct a scale for obtaining specific densities of value higher than those indicated on the illustrated scale, as from 2 to 10, the angle between the weight and body arm may be changed so that the graduations shall be as nearly equal as possible.

Having thus described my invention, I claim:

1. A tangent balance for use in determining specific densities by the submersion method, comprising a beam with one of its balancing arms adapted to have the body, the specific density of which is to be determined, suspended therefrom and the other arm adapted to have a counterbalancing weight carried thereby, a pointer controlled by the movement of said beam when subjected to the buoyant effect of the displaced water on the body when submerged therein, a scale for said pointer, said scale having a balance mark thereon opposite the position assumed by the pointer when the body is balanced by the counterweight and said scale being graduated in progressively increasing numerical values from the numeral "one" located opposite the position assumed by the pointer when the buoyant effect of the displaced water balances the weight of the displacing body, toward said balance mark on the scale, each particular value being equal to the expression $$\frac{1}{\tan.\alpha} + 1$$

where $\alpha$ is the angle of movement of the pointer in passing from the balance mark to the position of the particular numerical value on the scale.

2. A tangent balance for use in determining specific densities by the submersion method, comprising a beam with one of its balancing arms adapted to have the body, the specific density of which is to be determined, suspended therefrom and the other arm adapted to have a counterbalancing weight carried thereby and movable thereon, said counterbalancing weight having a movement toward the perpendicular passing through the fulcrum of the balance so that the weight will be positioned a distance from the perpendicular equal to the cos. of the angle of movement of the balance when the body is subjected to the buoyant effect of the displaced water on the submerged body and means for measuring this position of the weight in terms of specific densities.

3. A tangent balance for use in determining specific densities by the submersion method comprising a beam with one of the balance arms thereof adapted to have the body, the specific density of which is to be determined, suspended therefrom and the other arm being screw threaded, a counterbalancing weight adjustable on said threaded arm for movement to and from the fulcrum thereby to balance the body in air, a pointer moved with said beam, a scale for said pointer having a mark thereon opposite the position assumed by the pointer when said beam is balanced and a second mark opposite the position assumed by the pointer when the body is not exerting any force on the balance, said scale being graduated between said marks with the value "one" at said second mark and with gradually progressing numerical values extending from this "one" toward the first named mark and designated to indicate the specific densities of the body.

4. In a device of the class described, the combination with a balance beam including a body arm adapted to have the body, the specific density of which is to be determined, suspended therefrom and a counterbalancing weighted arm, a pointer controlled by the movement of said beam, a scale for said pointer, a portion of said scale being graduated in equal divisions and designated with progressing numerical values from "one" which is positioned opposite the position assumed by the pointer when the body is not exerting any force on the body arm to the value "two" positioned on the scale forty-five degrees from the value "one" in a direction opposite to the direction of movement of said pointer when passing from its position when the balance is in equilibrium toward the position indicated by the value "one".

Signed at New Bedford in the county of Bristol and State of Massachusetts this seventeenth day of August A. D. 1914.

PHILIP E. YOUNG.

Witnesses:
R. A. TERHUNE,
FLORA M. LEARY.